W. E. Clarke,
Inkstand.
No. 80,140. Patented July 21, 1868.
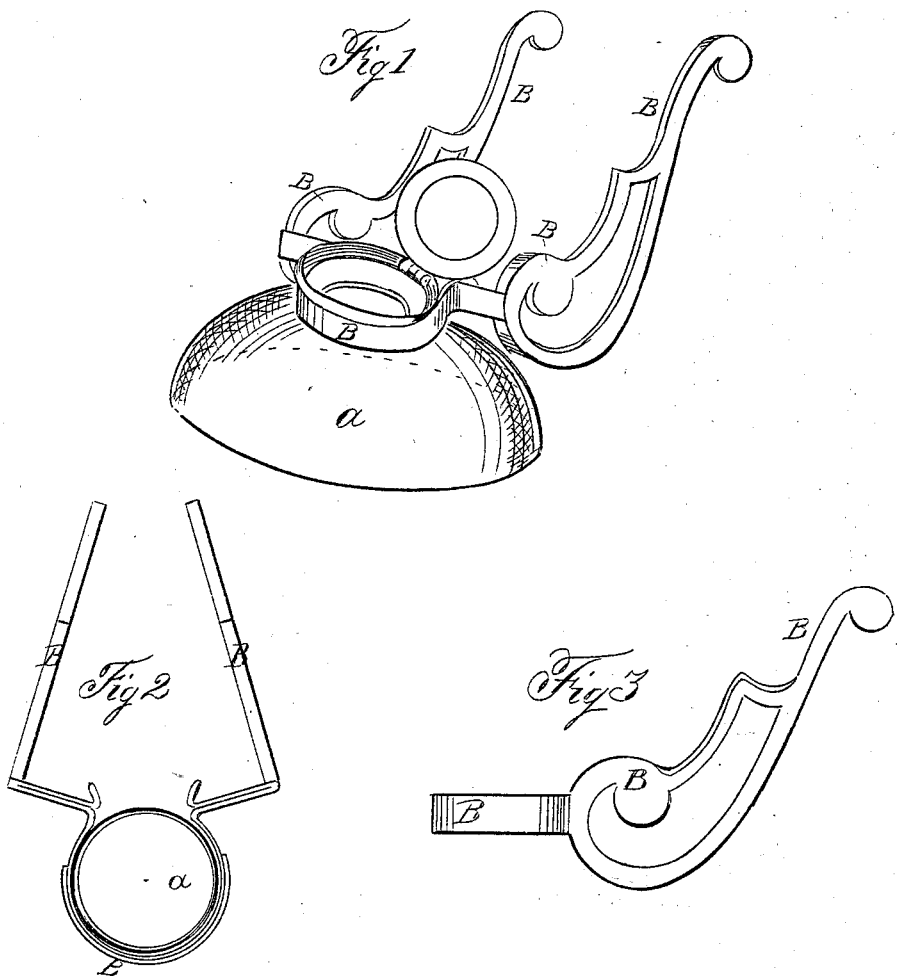

United States Patent Office.

WILLIAM E. CLARKE, OF ATTLEBOROUGH, ASSIGNOR TO HENRY F. MARSH, OF BOSTON, MASSACHUSETTS.

*Letters Patent No. 80,140, dated July 21, 1868.*

IMPROVEMENT IN PEN-RACKS.

*The Schedule referred to in these Letters Patent and making part of the same.*

TO ALL WHOM IT MAY CONCERN:

Be it known that I, WILLIAM E. CLARKE, of Attleborough, county of Bristol, and State of Massachusetts, have invented a new and improved Adjustable Pen-Rack; and I do hereby declare that the following is a full and exact description thereof, reference being had to the accompanying drawings, making part of this specification.

The object of my invention is to produce a cheap and convenient adjustable pen-rack.

My invention consists in a clasp made to spring on to the neck of an ordinary inkstand, the clasp having a rack attached.

In the drawings annexed—

Figure 1 shows an inkstand and rack combined.

Figure 2 shows a vertical view of the rack removed from the inkstand.

Figure 3 shows a side view of the rack removed from the inkstand.

A is a common inkstand.

B is an adjustable pen-rack, made of brass or any suitable material.

C is the neck of the inkstand.

The circular base of the rack B is made as a spring, in order to clasp firmly around the neck C of the inkstand.

This rack may be made to hold one or more pens, and may be made in different shapes and devices, but the one furnished is a convenient rack, and shows my invention.

I claim the device B, or its equivalent, for an adjustable pen-rack, as and for the purposes specified.

Boston, May 4, 1868.

WM. E. CLARKE.

Witnesses:
    CARROLL D. WRIGHT,
    A. F. BUTTERWORTH.